(12) United States Patent
Schmid et al.

(10) Patent No.: US 8,020,906 B2
(45) Date of Patent: Sep. 20, 2011

(54) EASILY MOUNTABLE MOTOR VEHICLE CRASH APPARATUS

(75) Inventors: Ralf Schmid, Karlsruhe/Gruenwettersbach (DE); Martin Sedlar, Bratislava (SK)

(73) Assignee: Dr. Ing h.c.F. Porsche Aktiengesellschaft (DE)

( * ) Notice: Subject to any disclaimer, the term of this patent is extended or adjusted under 35 U.S.C. 154(b) by 182 days.

(21) Appl. No.: 12/180,343

(22) Filed: Jul. 25, 2008

(65) Prior Publication Data
US 2009/0026777 A1    Jan. 29, 2009

(30) Foreign Application Priority Data
Jul. 28, 2007   (DE) .................. 10 2007 035 483

(51) Int. Cl.
*B60R 19/34* (2006.01)
(52) U.S. Cl. .................. 293/133; 293/132; 296/187.09; 296/193.09
(58) Field of Classification Search ............. 296/187.09, 296/203.04, 203.02, 187.03, 187.11; 293/132, 293/133, 155
See application file for complete search history.

(56) References Cited

U.S. PATENT DOCUMENTS

| 6,152,521 | A  | * | 11/2000 | Hayashi et al. | 296/187.09 |
| 6,929,297 | B2 | * | 8/2005  | Muller et al.  | 293/133 |
| 7,066,509 | B2 | * | 6/2006  | Kollaritsch et al. | 293/133 |

FOREIGN PATENT DOCUMENTS

| DE | 196 35 285 A1    | 3/1997 |
| DE | 199 59 701 A1    | 6/2001 |
| DE | 698 06 695 T2    | 7/2002 |
| DE | 102 20 633 A1    | 11/2002 |
| DE | 103 21 766 A1    | 12/2004 |
| DE | 10 2004 002 948 A1 | 8/2005 |
| DE | 10 2004 020 746 A1 | 12/2005 |
| JP | 8324454          | 12/1996 |
| JP | 2000081069       | 3/2000 |
| JP | 2005162049       | 6/2005 |
| JP | 2006206000       | 8/2006 |

* cited by examiner

*Primary Examiner* — Glenn Dayoan
*Assistant Examiner* — Melissa A Black
(74) *Attorney, Agent, or Firm* — Gerald E. Hespos; Michael J. Porco

(57) ABSTRACT

A crash apparatus, in particular a crash box in a motor vehicle, has a deformation body for absorbing energy in the event of a crash, which body is assembled from two half shells having beads running transversely to the main deformation direction. The two half shells each have outwardly projecting flanges with beads also running transversely to the main deformation direction. The two half shells exclusively press against one another via the contact surfaces lying between the beads of the flanges and are connected to one another in these areas.

15 Claims, 3 Drawing Sheets

EASILY MOUNTABLE MOTOR VEHICLE CRASH APPARATUS

CROSS-REFERENCE TO RELATED APPLICATIONS

This application claims priority to German Patent Application No. 10 2007 035 483.7 filed Jul. 28, 2007, the disclosure of which is incorporated by reference herein.

BACKGROUND AND SUMMARY OF THE INVENTION

The present invention relates to a crash apparatus, in particular a crash box in a motor vehicle, having a deformation body which absorbs energy in case of crash, and to a motor vehicle equipped with such a crash apparatus.

To avoid damage to a vehicle structure of a motor vehicle in the event of a front or rear impact at low velocities, crash apparatuses, so-called crash boxes, are typically situated between a vehicle longitudinal girder and a bumper cross member. Crash boxes of this type are preferably thin-walled and typically rectangular elements made of metal or plastic and, in the event of a front or rear impact on the vehicle, convert the kinetic energy resulting from the impact into deformation work, to prevent a critical load level, at which the longitudinal girder may be permanently damaged, from being exceeded.

A crash apparatus according to the species having an oblong deformation body is described in DE 103 21 766 A1. The known crash apparatus is provided with openings which are to even out the force curve occurring in case of a crash over the deformation distance. The deformation body is assembled from two U-shaped shell bodies, with the openings being provided along the longitudinal edges of the deformation profile.

A vehicle bumper bar and/or vehicle bumper configuration is shown in DE 102 20 633 A1 and has a support bracket in the form of a molded multistep tubular construction having multiple plastically deformable linear tubular parts of various external diameters. These tubular parts adjoin one another and may be pushed one into another to absorb energy, by which the kinetic energy occurring in case of a crash may be converted into deformation work.

A device for impact energy absorption in motor vehicles having a box profile in sheet-metal construction is shown in DE 199 59 701 A1. This known box profile is implemented having a conical expansion in the introduction direction of a force to be absorbed so that when it is compressed by the force to be absorbed, the deformed material essentially accumulates in folds within the cross-section of the remaining deformation length of the box profile.

Finally, a lateral frame structure having a two-shell crash element is shown in DE 196 35 285 A1. One shell is implemented as longer than the other shell in the deformation direction of the crash element so that a stepped deformation behavior results in case of crash.

An object of the present invention is to provide an improved or alternative crash apparatus that allows simple mounting.

This object has been achieved with the recognition of assembling a crash apparatus having a deformation body which absorbs energy in case of crash from two half shells, with flanges projecting outward being situated on each of the two half shells, via which the two half shells are connected fixed to one another. The deformation body of the crash apparatus is formed as an oblong hollow profile and has beads running transversely to the main deformation direction, which are also found in the outwardly projecting flanges of the half shells. The beads in the flanges form a boundary for contact surfaces lying between the beads, and the two half shells of the deformation body exclusively press against one another via the contact surfaces lying between the beads of the flanges and also exclusively are connected to one another via these contact surfaces. The flanges on the two half shells make mounting of the deformation body easier, because they provide a predefined connection surface, namely the contact surfaces, for connecting the two half shells. The two half shells are preferably connected to one another via spot welds which lie in the contact surfaces. In addition, easy positioning and/or orientation of the two half shells to one another is achievable through the flanges according to the invention, resulting in increased quality of the deformation body to be produced.

The beads of the flanges of the two half shells expediently lie opposite when the crash box is mounted, i.e., when the deformation body is mounted. This offers the advantage that a deformation behavior of the deformation body is uniquely determinable and thus settable by the precisely predetermined location of the beads. Simultaneously, the opposing beads of the two half shells offer a visual check for the mounting which is easy to perform, because the beads of both half shells must lie opposite when the half shells are positioned perfectly to one another.

In a further advantageous embodiment for achieving the object of the present invention, the crash apparatus has a bulkhead element running transversely to the main deformation direction of the deformation body, on which element a front face of the deformation body is fixed. This bulkhead element, implemented as a bulkhead plate, for example, causes a uniform load introduction of the impact forces acting on the deformation body in case of crash into a vehicle longitudinal girder of the motor vehicle. Simultaneously, the bulkhead element according to the present invention offers the great advantage of making mounting of the deformation body on a vehicle longitudinal girder easier, because it does not have to be fastened directly on its front face to the vehicle longitudinal girder. Instead it can be indirectly fastened via the bulkhead element, on which holes for a screw fastening for easy mounting may be provided.

In a yet further advantageous embodiment, the bulkhead element has a depression/embossing adapted to the front cross-sectional shape of the deformation body. A depression of this type makes positioning the deformation body on the bulkhead element before assembly easier and ensures an exactly predefined and uniquely oriented relative position between the bulkhead element and the deformation body. Simultaneously, a depression/embossing of this type also offers the advantage of easier connection between the bulkhead element and the deformation body, because welding may be performed significantly more easily along a depression/embossing edge.

The two half shells are expediently welded to one another on their contact surfaces, in particular connected to one another via spot welds. Spot welds of this type offer the great advantage of only causing a slight introduction of heat into the two half shells of the deformation body because spot welding produces significantly less deformation and/or warping than with other types of welding. The dimensional precision of the deformation body to be produced may thus be increased by spot welding of this type.

Other objects, advantages and novel features of the present invention will become apparent from the following detailed description when considered in conjunction with the accompanying drawing.

DETAILED DESCRIPTION OF THE DRAWING

Figure 1:
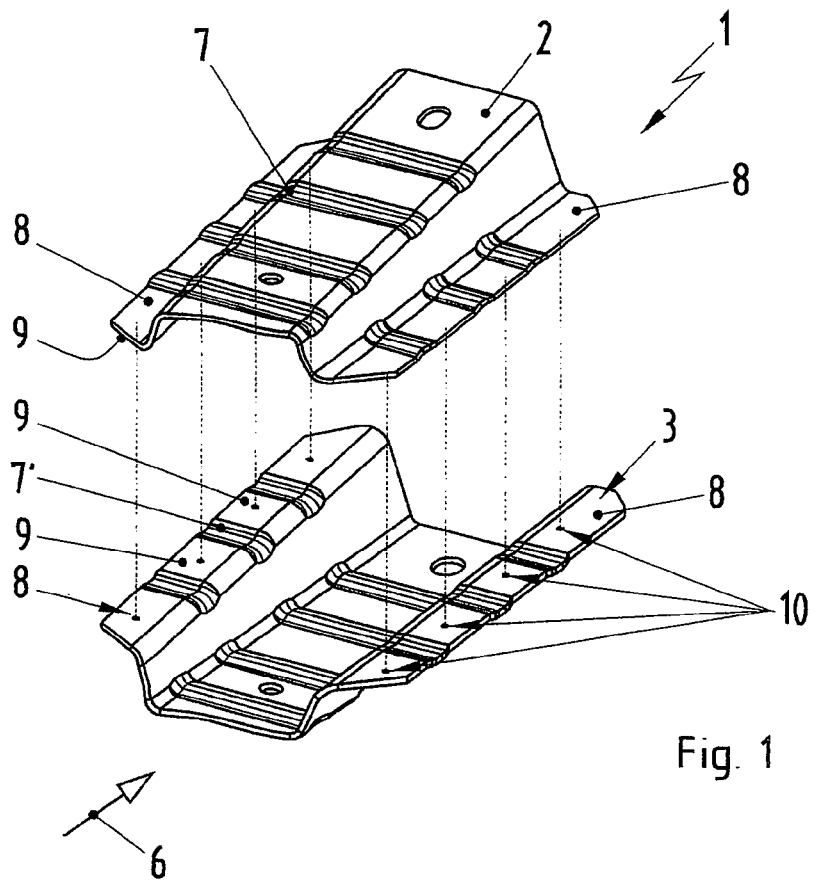
FIG. 1 is an exploded perspective view showing a crash apparatus deformation body according to the present invention.

According to FIG. 1, a crash apparatus 1 according to the present invention has a deformation body 4 assembled from two half shells 2, 3. The crash apparatus 1 is also typically designated as a so-called "crash box" and is preferably situated in a vehicle (not shown) between a frame support structure and a bumper 5 (see, e.g., FIG. 4). The deformation body 4 is in the illustrated embodiment configured as an oblong hollow profile, with the two half shells 2, 3 forming the deformation body 4. Each of the shell halves have beads 7 running transversely to the main deformation direction 6. The beads 7 and the beads 7' on the flanges 8 of the particular half shells 2, 3 can have, for example, a trapezoidal cross-sectional profile so that a hexagonal cross-section results in the completely mounted deformation body 4 in the area of the beads 7'.

The two half shells 2, 3 of the deformation body 4 are connected via the outwardly projecting flanges 8, two thereof being situated on the half shell 2 and two on the half shell 3. The flanges 8 of the two half shells 2, 3 also have beads 7' running transversely to the main deformation direction 6. Beads 7, 7' of this type are used for generating a defined deformation of the deformation body 4.

Contact surfaces 9 are located on the flanges 8, separated from one another in the main deformation direction 6 by the individual beads 7', via which the two half shells 2, 3 press against one another and are connected to one another. The beads 7' and the contact surfaces 9 are preferably positioned on both flanges 8 of the particular half shells 2, 3 so that the beads 7' and the contact surfaces 9 of the flanges 8 of the two half shells 2, 3 are opposite to one another in the mounted crash box, as is shown by way of example in FIG. 2. The contact surfaces 9 of the two half shells 2, 3 are preferably implemented as flat so that, in the mounted deformation body 4, contact of the particular contact surfaces 9 of the two half shells 2, 3 against one another over their entire area can occur. As may also be suggested by FIG. 2, the deformation body 4 is implemented as conical and specifically tapering conically opposite to the main deformation direction 6 according to the illustrated embodiment in FIG. 2.

The two half shells 2, 3 are preferably connected to the deformation body 4 via a welded connection, in particular via a spot weld connection, in which the individual spot welds 10 are in the area of the contact surfaces 9. A spot weld connection offers the great advantage of only generating a slight heat introduction into the component to be welded and thus reduces deformations and/or thermally-related tensions. The spot welds 10 may be provided on each contact surface 9 as shown in FIG. 1 or only on contact surfaces 9 especially selected for this purpose.

Figure 2:
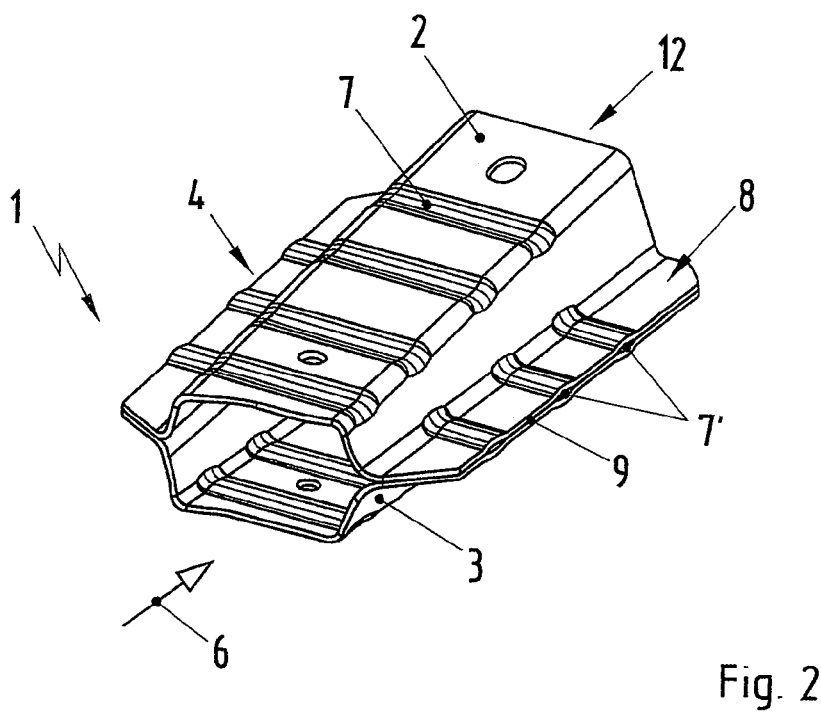
FIG. 2 is a perspective view showing the deformation body of FIG. 1 in a completely assembled state.

From FIG. 2, it can be seen that, except for the laterally projecting flanges 8, the two half shells 2, 3 each have a trapezoidal cross-section, so that the completely mounted deformation body 4 has a hexagonal cross-section. Of course, other cross-sections are also contemplated, such as a rectangular cross-section having the laterally projecting flanges 8.

Figure 3:
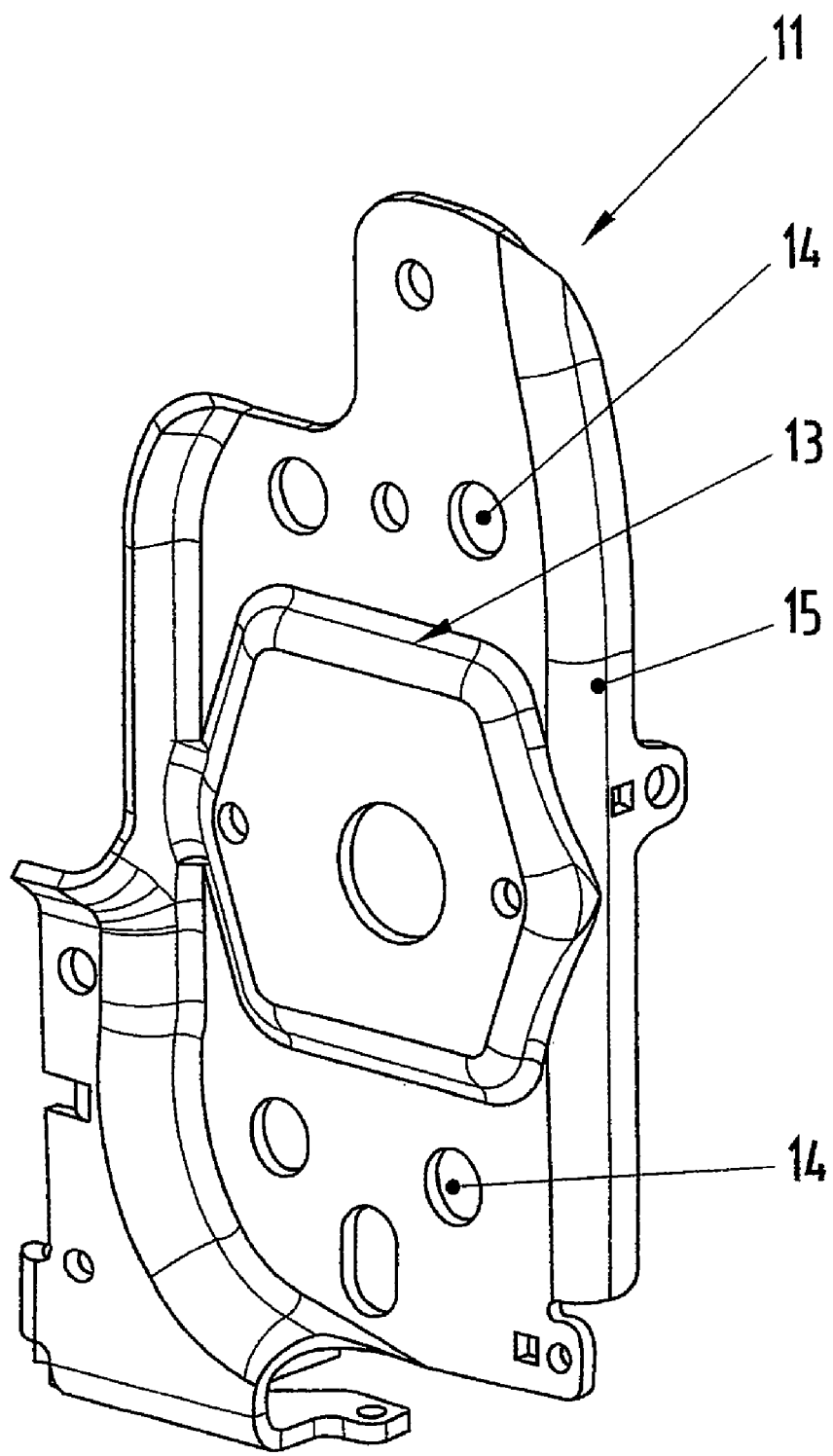
FIG. 3 is a perspective view showing a bulkhead element according to the present invention for fastening the deformation body of FIG. 2 to a vehicle body structure.

A bulkhead element 11 is shown in FIG. 3, which is implemented as, for example, a bulkhead plate, and to which the front face 12 of the deformation body 4 is attached, by, in particular being welded. The bulkhead element 11 runs essentially transversely to the main deformation direction 6 of the deformation body 4 and forms an attachment plate for connecting the deformation body 4 to a vehicle structure, for example, to a vehicle longitudinal girder. As shown in FIG. 3, the bulkhead element 11 has a depression/embossing region 13 adapted to the front cross-sectional shape of the deformation body 4, by which the mounting of the deformation body 4 on the bulkhead element 11 is significantly simplified. The deformation body 4 is typically welded to the bulkhead element 11, whereby the depression/embossing 13 allows exact and simultaneously easy positioning of the deformation body 4 on the bulkhead element 11. The depression/embossing region 13 simultaneously stiffens the bulkhead element 11 whose crash behavior is thus improved. Furthermore, the bulkhead element 11 has various through openings 14, via which the bulkhead element 11 may be fixed on the vehicle structure, for example, on the vehicle longitudinal girder, by passing a screw therethrough. It is also intended that specific edge areas 15 of the bulkhead element 11 are implementable as being angled, by which the rigidity of the bulkhead element 11 may also be increased.

Figure 4:
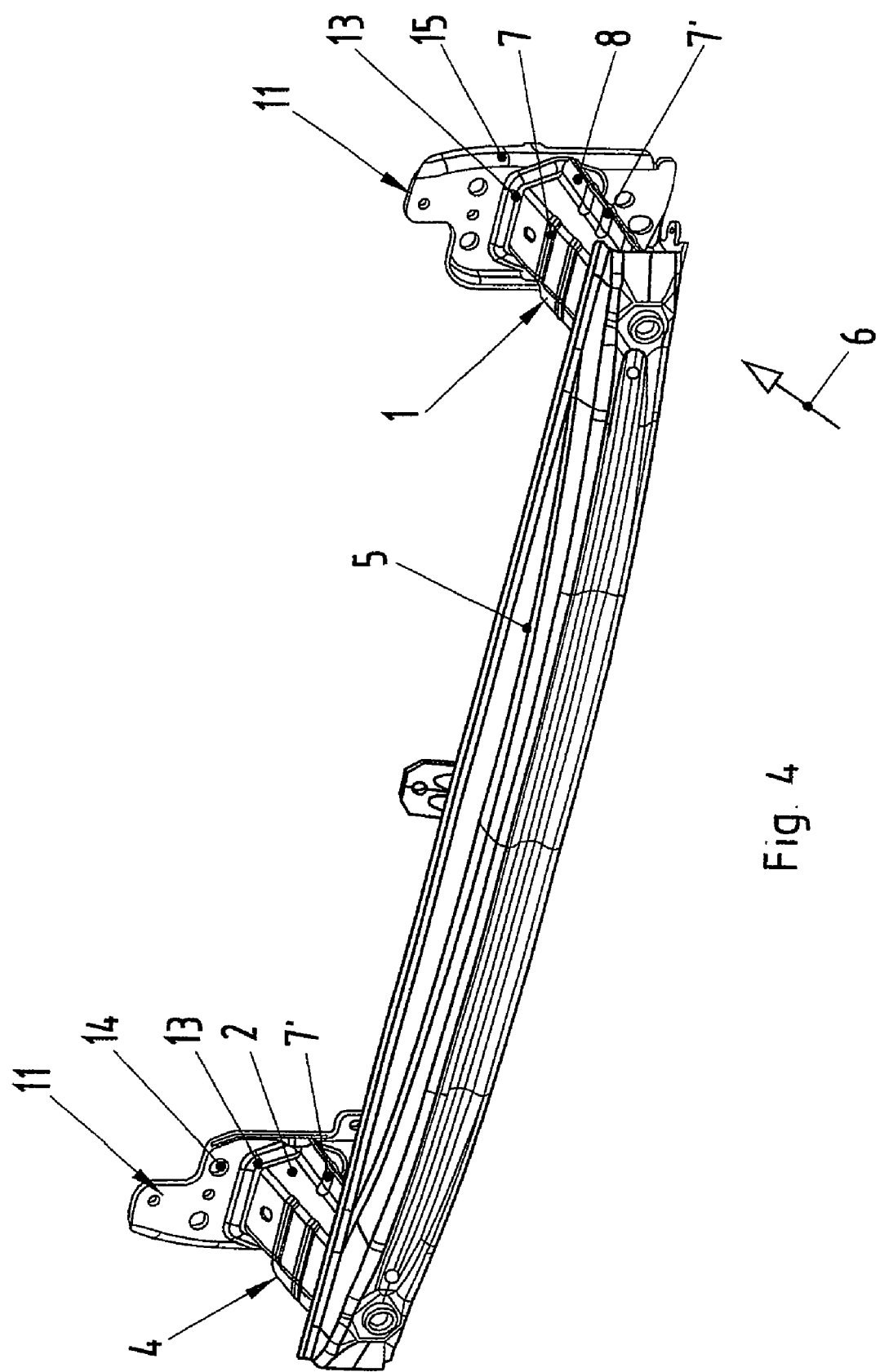
FIG. 4 is a perspective view showing two crash apparatuses of the type shown in FIG. 2, having a bumper mounted thereon.

FIG. 4 shows the crash apparatus 1 shortly before a connection to a vehicle structure (not shown). The two deformation bodies 4 already shown as being connected to the associated bulkhead elements 11. On their ends facing away from the bulkhead element 11, the bumper 5 is fixed on the deformation bodies 4. The crash apparatus 1 is thus situated between the bumper 5 and a standard vehicle longitudinal girder (not shown) to convert by deformation of the body 4 the kinetic energy resulting from an impact into deformation work. This helps to avoid damage to the vehicle structure upon front or rear impacts at low velocities in particular, because the crash apparatuses 1 prevent a critical load level, at which the longitudinal girder may be permanently damaged, from being exceeded, if the impact energies are low enough. In the least favorable case, only the crash apparatuses 1 thus have to be replaced in the event of low impact forces, while in contrast the frame support structure remains unharmed.

The crash apparatuses 1 are typically produced from metal or plastic, in particular pressed sheet-metal shells or aluminum parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A crash apparatus for a motor vehicle, comprising:
    a crash box having opposite top and bottom shells, each of the shells having a base panel, opposite first and second side panels projecting angularly from the base panel and first and second flanges projecting outwardly from ends of the respective first and second side panels remote from the base panel, the flanges of the top shell being registered with the flanges of the bottom shell and the base panels of the respective shells being opposed to and spaced from one another so that the shells define a hollow profile with opposite front and rear ends spaced apart along a deformation direction, the base panel of each of the shells being formed with beads spaced apart along the deformation direction and extending transverse to the deformation direction, each the flanges being formed with beads spaced apart along the deformation direction and extending transverse to the deformation direction, the beads on the flanges of the top shell having concave surfaces registered with and facing respective concave surfaces defined by the beads on the flanges of the bottom shell, substantially planar contact surfaces being defined on the flanges between the beads, the planar contact surfaces on the flanges of the top shell being secured respectively to the planar contact surfaces of the flanges of the bottom shell and so that each of the beads on the flanges defines a convex surface facing outwardly on the crash box wherein each of the beads on each of the base panels has opposite first and second ends aligned with but spaced from the respective beads on the flanges and portions of the side walls between the beads on the base panel and the respective beads on the flanges being substantially planar.

2. The crash apparatus of claim 1, wherein the beads on each of the base panels have concave surfaces facing outwardly on the crash box.

3. The crash box apparatus of claim 1, further comprising a bulkhead element having a plate aligned substantially transverse to the main deformation direction and an embossment projecting from the plate and configured to nest in one of the front and rear ends of the crash box, portions of the embossment in proximately to the plate being welded to a crash box.

4. The crash apparatus of claim 3, wherein the embossment includes a continuous peripheral side wall projecting angularly from the plate and a center panel having an outer periphery unitary with parts of the side wall remote from the plate, the center panel extending inwardly from the continuous peripheral side wall, the side wall being nested in one of the front and rear ends of the crash box and being welded to the crash box.

5. The crash apparatus according to claim 1, wherein each of the two half shells tapers conically opposite to the main deformation direction.

6. The crash apparatus according to claim 1, wherein a hexagonal cross-sectional profile is formed by the connected half shells.

7. The crash apparatus according to claim 1, wherein at least one of the beads of the flanges and half shells has a trapezoidal cross-sectional profile.

8. The crash apparatus according to claim 1, wherein the half shells are welded to one another on the contact surfaces via spot welds.

9. A motor vehicle having a crash apparatus according to claim 1.

10. The motor vehicle according to claim 9, wherein each of the two half shells tapers conically opposite to the main deformation direction.

11. The motor vehicle according to claim 9, wherein a hexagonal cross-sectional profile is formed by the connected half shells.

12. The motor vehicle according to claim 9, wherein at least one of the beads of the flanges and half shells has a trapezoidal cross-sectional profile.

13. The motor vehicle according to claim 9, further comprising a bulkhead element running transversely to the main deformation direction and on which one of the front and rear ends of the deformation body is fixed.

14. The motor vehicle according to claim 13, wherein the bulkhead element has a depression/embossing region adapted to a cross-sectional shape of one of the front or rear ends of the deformation body.

15. The motor vehicle according to claim 9, wherein the half shells are welded to one another on the contact surfaces via spot welds.

* * * * *